US006943228B2

(12) United States Patent
Grootaert et al.

(10) Patent No.: US 6,943,228 B2
(45) Date of Patent: Sep. 13, 2005

(54) ULTRACLEAN FLUOROELASTOMER SUITABLE FOR USE IN THE MANUFACTURING OF ELECTRONIC COMPONENTS

(75) Inventors: Werner M. A. Grootaert, Oakdale, MN (US); Klaus Hintzer, Kastl (DE); Bernhard Hirsch, Burgkirchen (DE); Harald Kaspar, Burgkirchen (DE); Robert E. Kolb, Afton, MN (US); Gernot Löhr, Burgkirchen (DE); Werner Schwertfeger, Altoetting (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/627,461

(22) Filed: Jul. 25, 2003

(65) Prior Publication Data

US 2004/0024134 A1 Feb. 5, 2004

Related U.S. Application Data

(60) Provisional application No. 60/399,229, filed on Jul. 29, 2002.

(51) Int. Cl.[7] .................................................. C08F 2/00

(52) U.S. Cl. ......................... 526/217; 526/86; 526/249; 526/345

(58) Field of Search ................................ 526/217, 249, 526/86; 525/345

(56) References Cited

U.S. PATENT DOCUMENTS 4,214,060 A 7/1980 Apotheker et al.
4,259,463 A 3/1981 Moggi et al.
4,281,092 A 7/1981 Breazeale
4,745,165 A 5/1988 Arcella et al.
4,831,085 A 5/1989 Okabe et al.
5,266,650 A 11/1993 Guerra et al.
5,285,002 A * 2/1994 Grootaert .................... 526/222
5,463,021 A * 10/1995 Beyer et al. ................ 528/482
5,565,512 A 10/1996 Saito et al.
5,668,221 A 9/1997 Saito et al.
5,677,389 A * 10/1997 Logothetis et al. ......... 525/340
5,852,149 A * 12/1998 Abusleme et al. .......... 526/247
5,936,060 A * 8/1999 Schmiegel .................. 528/481
5,948,868 A * 9/1999 Albano et al. .............. 525/276
5,973,091 A * 10/1999 Schmiegel .................. 526/247
6,114,452 A 9/2000 Schmiegel
6,720,360 B1 * 4/2004 Grootaert et al. ............. 521/28
2002/0013438 A1 1/2002 Grootaert et al.

FOREIGN PATENT DOCUMENTS

EP 0 661 304 A1 7/1995
EP 0 769 521 A1 4/1997
EP 0 784 064 A1 7/1997
EP 1 050 546 A2 11/2000
WO WO 95/02634 * 1/1995
WO WO 00/09603 2/2000
WO WO 01/57100 8/2001
WO WO-01/57100 A * 8/2001
WO WO 01/92351 A2 12/2001
WO WO-2004/011510 A1 * 2/2004

OTHER PUBLICATIONS

*Zhurnal Obshchei Khimii*, vol. 36(5), pp. 862–871 (1966), CA 65 12206C.

*Journal of Organic Chemistry*, vol. 30, p. 3724–3728, (1965).

* cited by examiner

*Primary Examiner*—David W. Wu
*Assistant Examiner*—Henry S Hu
(74) *Attorney, Agent, or Firm*—Brian E. Szymanski

(57) ABSTRACT

A curable fluoroelastomer composition for preparing a perfluoroelastomer. The composition includes; (1) a perfluoropolymer having one or more cure-sites selected from a halogen capable of participating in peroxide cure reaction and/or nitrile groups; (2) an organic peroxide and/or a compound capable of effecting curing of the perfluoropolymer through said nitrile groups; and (3) optionally a polyunsaturated coagent. The perfluoropolymer in the composition is essentially free of ionic end groups and the total amount of metal cations in the composition is not more than 10 μg/g perfluoropolymer. The perfluoroelastomers may be obtained from curing the composition in a sufficiently low amount of metal cations so as to make the fluoroelastomer suitable for use in the semi-conductor industry.

9 Claims, No Drawings

ULTRACLEAN FLUOROELASTOMER SUITABLE FOR USE IN THE MANUFACTURING OF ELECTRONIC COMPONENTS

CROSS REFERENCE TO RELATED APPLICATION

This application claims priority to U.S. Provisional Patent Application No. 60/399,229, filed Jul. 29, 2002.

FIELD OF THE INVENTION

The present invention relates to fluoroelastomers of high purity, in particular of sufficient purity as required for use in the manufacturing of electronic components, in particular for use in manufacturing integrated circuit chips. In particular, the invention relates to a curable composition for making the desired fluoroelastomers, to a method of making fluoropolymers which are particularly suitable for use in such composition and to such fluoropolymers themselves.

BACKGROUND OF THE INVENTION

Fluoroelastomers and in particular perfluoroelastomers such as those described in "Modern Fluoropolymers", edited by John Scheirs, Wiley Science 1997, offer excellent protection against high service temperatures and are resistant to a wide variety of chemical reagents. Fluoroelastomers are elastomers prepared by curing a fluoroelastomer precursor ("fluoroelastomer gum") made from monomers containing one or more atoms of fluorine, or copolymers of such monomers with other monomers, the fluoromonomer(s) being present in the greatest amount by mass. The fluoroelastomer precursor is a fluoropolymer that is suitable to prepare a fluoroelastomer having desired elasticity properties. Typically, the fluoroelastomer precursor is an amorphous fluoropolymer or a fluoropolymer that hardly shows a melting point. When the fluoropolymer has a perfluorinated backbone, a perfluoroelastomer results but also polymers having a partially fluorinated backbone are used.

A commonly used process for the preparation of fluoropolymers is the aqueous emulsion polymerization which offers an environmental advantage over polymerization in solvents. Generally, the aqueous emulsion polymerization of fluorinated monomers is carried out in the presence of a fluorinated surfactant although techniques have also been developed in which no fluorinated surfactant is added to the polymerization.

Fluoroelastomers have been used successfully in a number of applications due to their ability to withstand high temperatures and aggressive chemicals, as well as the ability of the fluoroelastomer gum to be processed using standard elastomer processing equipment. Amongst other, fluoroelastomers have been used in the semiconductor industry in the chip manufacturing process where the fluoroelastomer may be used in seats of chip fabrication equipment. During chip manufacturing, the fluoroelastomer can be exposed to high temperature and aggressive chemicals. While the fluoroelastomers, and in particular perfluoroelastomers have been used in the semiconductor industry, there continues to be a need to improve the fluoroelastomers so as to make them more suitable for this specialized application. In particular, available fluoroelastomer compositions often have a too high amount of ionic components and in particular too high amounts of metal cations, which limits their suitability for use in the chip manufacturing. This is particularly the case if the fluoropolymer that is used to make the fluoroelastomer, was prepared through an aqueous emulsion polymerization process.

It would thus be desirable to find an alternative method for producing high purity fluoropolymers and fluoroelastomers such that they meet the demands of the semiconductor industry and are suitable for use therein.

SUMMARY OF THE INVENTION

In one aspect the invention provides a curable fluoroelastomer composition for preparing a perfluoroelastomer, the composition comprising:

- a perfluoropolymer having one or more cure-sites selected from a halogen capable of participating in peroxide cure reaction and/or nitrite groups;
- an organic peroxide and/or a compound capable of effecting curing of the perfluoropolymer through said nitrile groups; and
- optionally a polyunsaturated coagent;

wherein the perfluoropolymer is essentially free of ionic end groups and wherein the total amount of metal cations in the composition is not more than 10 $\mu$g/g perfluoropolymer.

The perfluoroelastomers that can be obtained from curing the above identified composition has a sufficient low amount of metal cations so as to make the fluoroelastomer suitable for use in the semi-conductor industry. Furthermore, the perfluoropolymer constituent of the composition can be produced through aqueous emulsion polymerization processes and does not require special work-up procedures or extra steps to remove ions so as to achieve the desired low amount of metal cations.

In another aspect, the invention thus also provides a cured perfluoroelastomer obtained from curing the above defined composition and the use thereof in the manufacturing of electronic components, in particular in the manufacturing of wafers and chips where the perfluoroelastomer may be used as a sealing component of a chip or wafer manufacturing equipment.

In a further aspect, the invention provides a method of making a perfluoropolymer which is particularly preferred for use in a curable fluoroelastomer composition as defined above, comprising (i) an aqueous emulsion polymerization of (a) a fluorinated monomer selected from tetrafluoroethylene, chlorotrifluoroethylene and mixtures thereof with (b) a fluorinated monomer selected from perfluorinated $C_3$–$C_8$ olefins, perfluorinated vinyl ethers and mixtures thereof and (c) one or more fluorinated cure-site monomers selected from perfluorinated monomers having one or more halogen atoms capable of participating in a peroxide cure reaction or one or more nitrile groups, whereby the polymerization is being initiated with an initiator system selected from a combination of a fluoroaliphatic sulfinate and an oxidizing agent capable of oxidizing the sulfinate to a sulfonyl radical and/or a combination of a free radical initiator and a chloride salt such that the resulting perfluoropolymer is essentially free of ionic end groups and (ii) isolating the perfluoropolymer formed from the resulting aqueous dispersion by coagulating the perfluoropolymer, for example by adding a sufficient amount of a metal salt to cause coagulation of the perfluoropolymer particles in the dispersion or freeze coagulating the perfluoropolymer from the dispersion.

As will be appreciated from the above method, no special handling steps are needed to reduce the amount of metal cations to a desired low level. Thus, the above method provides a convenient and cost effective way to produce perfluoropolymers for preparing perfluoroelastomers meeting the high purity requirements of the semiconductor industry.

Still further, the invention provides a perfluoropolymer obtained by an aqueous emulsion polymerization and comprising units derived from a fluorinated monomer selected from (a) tetrafluoroethylene, chlorotrifluoroethylene and mixtures thereof, (b) one or more units derived from a fluorinated monomer selected from perfluorinated $C_3$–$C_8$ olefins, perfluorinated vinyl ethers and mixtures thereof and (c) one or more units deriving from fluorinated cure-site monomers selected from perfluorinated monomers having one or more halogen atoms capable of participating in a peroxide cure reaction or one or more nitrile groups, the perfluoropolymer comprising perfluoroaliphatic end groups and/or $CF_2Cl$ end groups and being essentially free of ionic end groups and the amount of metal ions contained in the perfluoropolymer being less than 10 $\mu$g/g of perfluoropolymer.

DETAILED DESCRIPTION OF THE INVENTION

It was found in connection with the present invention that perfluoropolymers that are essentially free of ionic end groups are particularly suitable for making fluoroelastomers for the semiconductor industry. In particular, such perfluoropolymers may be produced through commonly employed aqueous emulsion polymerization techniques and the fluoropolymers can subsequently be isolated from the resulting aqueous dispersion using common coagulation techniques that may involve the use of metal salts such as magnesium chloride or alternatively the latex can be freeze coagulated. Thus, despite the fact that no steps are taken to remove ions from the aqueous fluoropolymer dispersion and despite the fact that metal salts may be used to coagulate the fluoropolymer in the dispersion, it was found that fluoropolymers that are essentially free of ionic end groups, yield polymers of high purity that are sufficiently low in their content of metal ions such that they are suitable for use in the semiconductor industry. Typically, the amount of remaining metal cations in the resulting fluoropolymer will be not more than 10 $\mu$g per gram of the fluoropolymer, i.e. not more than 10,000 ppb. Preferably, the amount of metal cations will not be more than 7,000 ppb.

By the term 'remaining metal cations' is meant metal ions that can be analytically found after subjecting the polymer sample under the test conditions as set forth in the example section below.

By the term 'essentially free of ionic end groups' is meant that the fluoropolymer is free of ionic end groups or contains ionic end groups in such an amount that the absorbance ratio determined by calculating the integrated peak intensity within the range of 1840 $cm^{-1}$–1620 $cm^{-1}$ to the integrated peak intensity in the range 2740 $cm^{-1}$–2220 $cm^{-1}$ in a Fourier transform infrared spectrum of the perfluoropolymer, is less than 0.1. This absorbance ratio is usually used in the art to indicate the level of carboxylic end groups (U.S. Pat. No. 6,114,452). The aqueous emulsion polymerisation is typically carried out under conditions such that the ionic end groups that form are essentially carboxylic end groups and thus, the absorbance ratio can be taken as a measure of the residual content of ionic end groups in the polymer.

By the term 'perfluoro' or 'perfluorinated' in connection with this invention is meant that the respective compound has all hydrogen atoms replaced by fluorine atoms without however excluding the possibility that some of the hydrogen atoms have been replaced with chlorine, bromine or iodine atoms. Specifically, the term 'perfluoropolymer' is intended to mean a fluoropolymer that has a perfluorinated backbone, i.e. a backbone in which the hydrogen atoms are replaced with fluorine atoms without excluding polymers wherein some of the hydrogen atoms have been replaced with another halogen than fluorine such as for example chlorine as may be the case if the fluoropolymer derives from a polymerisation involving chlorotrifluoroethylene.

Perfluoropolymers that are conveniently used to prepare the perfluoroelastomer, can be prepared by an aqueous emulsion polymerization. Preferably the perfluoropolymer is prepared by a polymerization of a perfluorinated monomer such as for example tetrafluoroethylene, chlorotrifluoroethylene and mixtures thereof with a fluorinated monomer selected from perfluorinated $C_3$–$C_8$ olefins, perfluorinated vinyl ethers and mixtures thereof and one or more fluorinated cure-site monomers selected from perfluorinated monomers having one or more halogen atoms capable of participating in a peroxide cure reaction or one or more nitrile groups. Halogens capable of participating in a peroxide cure reaction may include chlorine, bromine or iodine atoms.

Examples of perfluorinated vinyl ether monomers that may be used include those corresponding to the formula:

$$CF_2{=}CF{-}O{-}R_f$$

wherein $R_f$ represents a perfluorinated aliphatic group that may contain one or more oxygen atoms. Preferably, the perfluorovinyl ethers correspond to the general formula:

$$CF_2{=}CFO(R_fO)_n(R'_fO)_mR''_f$$

wherein $R_f$ and $R'_f$ are different linear or branched perfluoroalkylene groups of 2–6 carbon atoms, m and n are independently 0–10, and $R''_f$ is a perfluoroalkyl group of 1–6 carbon atoms. Examples of perfluorovinyl ethers according to the above formulas include perfluoro-2-propoxypropylvinyl ether (PPVE-2), perfluoro-3-methoxy-n-propylvinyl ether, perfluoro-2-methoxy-ethylvinyl ether, perfluoromethylvinyl ether (PMVE), perfluoro-n-propylvinyl ether (PPVE-1) and $CF_3{-}(CF_2)_2{-}O{-}CF(CF_3){-}CF_2{-}O{-}CF(CF_3){-}CF_2{-}O{-}CF{=}CF_2$.

The polymerization is initiated with an initiator system selected from a combination of a fluoroaliphatic sulfinate and an oxidizing agent capable of oxidizing the sulfinate to a sulfonyl radical and/or a combination of a free radical initiator and a chloride salt such that the resulting perfluoropolymer is essentially free of ionic end groups.

Thus, according to one embodiment, the initiation system involves the use of a free radical initiator, e.g. persulfates, permanganic acid or a salt thereof such as potassium permanganate, and a chloride salt such as a chloride salt of the formula:

$$M^aCl_n$$

wherein $M^a$ represents a mono- or multi-valent cation and n corresponds to the valence of the cation. Suitable cations $M^a$ include organic and inorganic cations. Particularly useful cations are ammonium and metal cations including monovalent cations such as sodium and potassium as well as divalent cations such as calcium and magnesium. Examples of ammonium chloride salts include tetraalkyl ammonium chlorides such as tetrabutyl ammonium chloride as well as $NH_4Cl$. Generally, by increasing the amount of chloride salt, the number of ionic end groups reduces. It is believed that the use of chloride salt in the initiation system results in the formation of $CF_2Cl$ end groups. Generally, the amount of chloride salt is selected such that the molar ratio of chloride ions to initiator (e.g. permanganate) is between 1:0.1 and 0.1:10, preferably between 1:0.5 and 0.1:5.

An alternative method to obtain a fluoropolymer essentially free of ionic end groups involves the use of a combination of a fluoroaliphatic sulfinate, preferably a perfluoroaliphatic sulfinate and an oxidizing agent capable of oxidizing the sulfinate to a sulfonyl radical as disclosed in U.S. Pat. No. 5,285,002. Suitable oxidizing agents include for example a persulfate such as ammonium persulfate. Use of a fluoroaliphatic sulfinate typically results in (per) fluoroaliphatic end groups in the fluoropolymer.

The fluoroaliphatic sulfinate typically will correspond to the following formula:

$$R_fSO_2M_{1/x}$$

wherein $R_f$ represents a monovalent fluoroaliphatic radical having, for example, from 1 to 20 carbon atoms, preferably 4 to 10 carbon atoms, M represents a hydrogen atom or cation with valence x, which is 1 to 2, and is preferably 1. Examples of cations are ammonium, sodium and potassium cations.

The monovalent fluoroaliphatic radical, $R_f$ is a fluorinated, stable, inert, non-polar, saturated moiety. It can be straight chain, branched chain, and, if sufficiently large, cyclic, or combinations thereof, such as alkyl cycloaliphatic radicals. Generally, $R_f$ will have 1 to 20 carbon atoms, preferably 4 to 10, and will contain 40 to 83 weight percent, preferably 50 to 78 weight percent fluorine. The preferred compounds are those in which the $R_f$ group is fully or substantially completely fluorinated, as in the case where $R_f$ is perfluoroalkyl, $C_nF_{2n+1}$, where n is 1 to 20.

With respect to $R_f$, the skeletal chain of carbon atoms can be interrupted by divalent oxygen, hexavalent sulfur or trivalent nitrogen hetero atoms, each of which is bonded only to carbon atoms, but preferably where such hetero atoms are present, such skeletal chain does not contain more than one said hetero atom for every two carbon atoms. An occasional carbon-bonded hydrogen atom, iodine, bromine, or chlorine atom may be present; where present, however, they preferably are present not more than one for every two carbon atoms in the chain. Where $R_f$ is or contains a cyclic structure, such structure preferably has 6 ring member atoms, 1 or 2 of which can be said hetero atoms, e.g., oxygen and/or nitrogen. Examples of sulfinates for use in this invention are disclosed in U.S. Pat. No. 5,285,002 which is incorporated herein by reference.

The amount of initiator employed is typically between 0.01 and 2% by weight, preferably between 0.03 and 1% by weight based on the total weight of the polymerization mixture. The full amount of initiator may be added at the start of the polymerization or the initiator can be added to the polymerization in a continuous way during the polymerization until a conversion of 70 to 80% is achieved. One can also add part of the initiator at the start and the remainder in one or separate additional portions during the polymerization.

Additionally to generate polymers with a low amount of ionic endgroups, perfluoro peresters can be used as initiators.

The aqueous emulsion polymerization process is generally conducted in the commonly known manner. Preferred polymerization temperatures are 10 to 100° C., preferably 30° C. to 80° C. and a pressure of 4 to 30 bar, in particular 6 to 15 bar.

The aqueous emulsion polymerization system may further comprise other materials, such as buffers and, if desired, complex-formers or chain-transfer agents. The aqueous emulsion polymerization will typically also include a fluorinated surfactant such as a perfluoroalkane sulphonic or carboxylic acid. Typically, the total amount of fluorinated surfactant used in the aqueous emulsion polymerization is between 0.1% by weight and 5% by weight based on the weight of fluoropolymer to be produced.

In order to introduce halogens, which are capable of participation in the peroxide cure reaction, along the chain, the copolymerization of the basic monomers of the fluoropolymer is carried out with a suitable fluorinated cure-site monomer (see for instance U.S. Pat. Nos. 4,745,165, 4,831,085, and 4,214,060). Such comonomer can be selected for instance from:

(a) bromo- or iodo- perfluoroalkyl-perfluorovinylethers having the formula:

$$Z\text{-}R_f\text{—O—CF═}CF_2$$

wherein Z is Br or I, $R_f$ is a perfluoroalkylene $C_1$–$C_{12}$, optionally containing chlorine and/or ether oxygen atoms; for example: $BrCF_2$—O—CF═$CF_2$, $BrCF_2CF_2$—O—CF═$CF_2$, $BrCF_2CF_2CF_2CF_2$—O—CF═$CF_2$, $CF_3CFBrCF_2$—O—CF═$CF_2$, and the like; and (b) bromo- or iodo perfluoroolefins such as those having the formula:

$$Z'\text{-}R'_f\text{—CF═}CF_2$$

wherein Z' is Br or I, $R'_f$ is a perfluoroalkylene $C_1$–$C_{12}$, optionally containing chlorine atoms; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1.

Alternatively or additionally, cure-site components in the fluoropolymer may derive from nitrile containing fluorinated monomers. Examples of nitrile containing monomers that may be used correspond to one of the following formulas:

$$CF_2\text{═CF—}CF_2\text{—O—}R_f\text{—CN}$$

$$CF_2\text{═CFO}(CF_2)_lCN$$

$$CF_2\text{═CFO}[CF_2CF(CF_3)O]_g(CF_2)_vOCF(CF_3)CN$$

$$CF_2\text{═CF}[OCF_2CF(CF_3)]_kO(CF_2)_uCN$$

wherein, 1 represents an integer of 2 to 12; g represents an integer of 0 to 4; k represents 1 or 2; v represents an integer of 0 to 6; u represents an integer of 1 to 6, $R_f$ is a perfluoroalkylene or a bivalent perfluoroether group. Specific examples of nitrile containing liquid fluorinated monomers include perfluoro(8-cyano-5-methyl-3,6-dioxa-1-octene), $CF_2$═$CFO(CF_2)_5CN$, and $CF_2$═$CFO(CF_2)_3OCF(CF_3)CN$.

When the cure-site containing monomer is a liquid fluorinated monomer, it will be preferred to provide at least part thereof as an aqueous micro-emulsion during the initial stages of the emulsion polymerization. The microemulsions are stable, isotropic mixtures of the liquid fluorinated monomer having a cure-site component, optionally a liquid perfluorinated hydrocarbon compound, water, and a fluorinated surfactant. By the term 'liquid' as used in conjunction with the fluorinated monomer or the perfluorinated hydrocarbon is meant that the respective components are liquid at ambient temperature and pressure conditions, i.e. at about 20° C. and about 1 atm. pressure. The microemulsions typically form spontaneously upon contact or gently stirring of the ingredients and optional heating. Generally, the temperature at which the micro-emulsion forms, i.e. when a clear and transparent mixture is obtained, is in the range of 40° C. to 90° C. Upon cooling, the mixture remains clear and transparent.

The fluorinated surfactant that can be used to prepare the microemulsion is a perfluorinated alkane sulphonic or carboxylic acid or salt thereof typically having between 4 and 12 carbon atoms, preferably 8 carbon atoms. Preferably, the fluorinated surfactant corresponds to the formula:

$$(Y—R_f\text{-}Z)_n\text{-}M^b \quad (I)$$

wherein Y represents Cl or F; $R_f$ represents a linear or branched perfluorinated alkylene having 4 to 10 carbon atoms; Z represents $COO^-$ or $SO_3^-$ $M^b$ represents a cation including monovalent and multivalent cations, and n corresponds to the valence of $M^b$. Examples of cations include ammonium, alkali metal cations such as sodium or potassium and earth alkaline metal cations such as calcium or magnesium.

The liquid perfluorinated hydrocarbon compound that can be used to prepare the micro-emulsion typically comprises between 3 and 25 carbon atoms, preferably between 5 and 20 carbon atoms and may contain up to 2 heteroatoms selected from oxygen, sulfur or nitrogen. Suitable perfluorinated hydrocarbons include perfluorinated saturated linear, branched and/or cyclic aliphatic compounds such as a perfluorinated linear, branched or cyclic alkane; a perfluorinated aromatic compound such as perfluorinated benzene, or perfluorinated tetradecahydro phenanthene. It can also be a perfluorinated alkyl amine such as a perfluorinated trialkyl amine. It can further be a perfluorinated cyclic aliphatic, such as decalin; and preferably a heterocyclic aliphatic compound containing oxygen or sulfur in the ring, such as perfluoro-2-butyl tetrahydrofuran.

Specific examples of perfluorinated hydrocarbons include perfluoro-2-butyltetrahydrofuran, perfluorodecalin, perfluoromethyldecalin, perfluoromethylcyclohexane, perfluoro(1,3-dimethylcyclohexane), perfluorodimethyldecahydronaphthalene, perfluorofluoorene, perfluoro(tetradecahydrophenanthrene), perfluorotetracosane, perfluorokerosenes, octafluoronaphthalene, oligomers of poly (chlorotrifluoroethylene), perfluoro(trialkylamine) such as perfluoro(tripropylamine), perfluoro(tributylamine), or perfluoro(tripentylamine), and octafluorotoluene, hexafluorobenzene, and commercial fluorinated solvents, such as Fluorinert FC-75, FC-72, FC-84, FC-77, FC-40, FC-43, FC-70 or FC 5312 all produced by 3M Company. It will further be clear to one skilled in the art that a mixture of perfluorinated hydrocarbons can be used to prepare the micro-emulsion.

The amounts of the components making up the micro-emulsion are typically selected as follows (all percentage expressed as % by weight based on the total weight of the micro-emulsion): between 5 and 50% of perfluoroalkane carboxylic or sulphonic acid or salt thereof, between 0 and 15% of liquid perfluorinated hydrocarbon compound and between 5 and 30% of liquid fluorinated monomer having a cure-site. Preferred ranges are between 10 and 30% of perfluoroalkane carboxylic or sulphonic acid or salt thereof, between 0.2 and 10% of liquid perfluorinated hydrocarbon compound and between 8 and 20% of liquid fluorinated monomer having a cure-site.

At the end of the aqueous emulsion polymerization process, an aqueous dispersion of the fluoropolymer is obtained. Usually, the average particle diameter as determined by dynamic light scattering methods is not more than 400 nm, typically in the range of 10 to 400 nm, preferably 40 to 250 nm. The fluoropolymer may be isolated from the dispersion by coagulation. Any of the known coagulation methods may be used including in particular coagulation by the addition of a metal salt to the fluoropolymer dispersion. Suitable metal salts that can be used include for example alkaline salts such as NaCl and earth alkaline metal salts such as magnesium chloride or Al-salts such $AlCl_3$. Preferably the amount added to the dispersion will be selected such that the minimal amount to cause the fluoropolymer to coagulate is added. Typically, a suitable amount of metal salt to cause coagulation is between 0.5 and 50 g salt per kg polymer.

Alternatively the fluoropolymer can be freeze coagulated to isolate the polymer. After freezing the dispersion, it is thawed and thawed liquid is removed. Removal of the thawed liquid is preferably carried out simultaneously with thawing of the frozen dispersion. The process typically also includes washing steps which is advantageously also carried out simultaneously with the thawing and removal of thawed liquid although one or more washing steps may be carried out subsequent to the thawing step. A process of freeze coagulation is disclosed for example in EP 1,050,546.

The fluoropolymer produced with the method of this invention is suitable for producing a fluoroelastomer therewith. To obtain a fluoroelastomer, a curable fluoroelastomer composition comprising the fluoropolymer and a cure composition is cured. The curable fluoroelastomer composition may be cured by any of the methods known to those skilled in the art. The cure composition typically includes one or more components that cause the fluoropolymer chains to link with each other thereby forming a three dimensional network. Such components may include catalysts, curing agents and/or coagents.

When the fluoropolymer includes cure-sites comprising halogens capable of participating in a peroxide cure reaction, the cure composition will typically include an organic peroxide. Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di (tertiarybutylperoxy)hexyne-3 and 2,5-dimethyl-2,5-di (tertiarybutylperoxy)hexane. Other peroxides can be selected from such compounds as dicumyl peroxide, dibenzoyl peroxide, tertiarybutyl perbenzoate, $\alpha,\alpha'$-bis(t-butylperoxy-diisopropylbenzene), and di[1,3-dimethyl-3-(t-butylperoxy)-butyl]carbonate. Generally, about 1–3 parts of peroxide per 100 parts of fluoropolymer is used.

When the fluoropolymer includes a nitrile containing cure site component, a catalyst comprising one or more ammonia-generating compounds may be used to cause curing. "Ammonia-generating compounds" include compounds that are solid or liquid at ambient conditions but that generate ammonia under conditions of cure. Such compounds include, for example, hexamethylene tetramine (urotropin), dicyan diamid, and metal-containing compounds of the formula:

$$A^{w+}(NH_3)_v Y^{w-}$$

where $A^{w+}$ is a metal cation such as $Cu^{2+}$, $Co^{2+}$, $Co^{3+}$, $Cu^+$, and $Ni^{2+}$; w is equal to the valance of the metal cation; $Y^{w-}$ is a counterion, typically a halide, sulfate, nitrate, acetate or the like; and v is an integer from 1 to about 7.

Also useful as ammonia-generating compounds are substituted and unsubstituted triazine derivatives such as those of the formula:

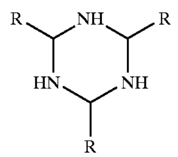

wherein R is a hydrogen or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer. Ammonia-generating compounds when used to effect curing of a fluoropolymer having nitrile groups, are typically used in an amount of 0.1 to 10 parts per hundred parts by weight (phr) of the fluoropolymer to cure the fluoropolymer to an elastomer having desired physical and mechanical properties.

Another or further component that can be used to cure nitrile containing fluoropolymers includes compounds of the following formula:

(II)

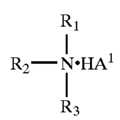

wherein the group $HA^1$ is an inorganic or organic acid, e.g., HCl, $HNO_3$, $C_7F_{15}COOH$, and wherein $R_1$, $R_2$, and $R_3$ are each, independently, the same or different alkyl groups having from 1 to about 20 carbon atoms, which may be cyclic or heterocyclic, and one R group may instead be a bond to another R group such that the nitrogen is bonded to or part of an alkenyl, cycloalkenyl, or aromatic group. The substituents may also be olefinic, e.g., mono, di, and trialkyl amine salts, and pyridine salts. Examples of compounds of above formula (II) include compounds of the formula:

(IIA)

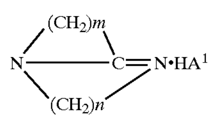

wherein m and n are, independently, 2 to 20.

Preferred examples of Formula (IIA) compounds include those wherein m=3 and n=5 and wherein m=4 and n=2. This includes, for example, salts of 1,8-diazabicyclo[5,4,0]undec-7-ene (DBU) and 1,5-diazabicyclo [4,3,0] non-5-ene (DBN). These salts may be prepared, for example, by reacting DBU or DBN with an organic or inorganic acid in an organic solvent such as methanol or acetone, or they may be prepared in situ. The acid can be organic or inorganic, for example $C_7F_{15}COOH$, or any hydrocarbon or fluorine containing carbonic acid, sulfonic acid, etc., and inorganic acids such as HCl, $HNO_3$, etc., that form stable salts. Another preferred compound of Formula IIA is pyridine hydrochloride. Compounds of formula (II) or (IIA) may be used in an amount of 0.05 to 10 phr of fluoropolymer, preferably in an amount of 0.5 to 5 phr of fluoropolymer to cause curing of a nitrile containing fluoropolymer.

Compounds of the aforementioned formula (II) or (IIA) are advantageously combined with imidates, including those having the formula $R^aC(OR^b)$=NH, and salts thereof, where $R^a$ and $R^b$ independently represent, a substituted or unsubstituted $C_1$–$C_{20}$ (preferably $C_1$–$C_{10}$, more preferably $C_1$–$C_7$) alkyl, aryl, aralkyl, alkenyl, cycloalkyl, or cycloalkenyl group. "Substituted" means substituted by substituents that do not interfere with the desired product. Examples of suitable substituents include halogen (e.g., chlorine, fluorine, bromine, iodine), cyano, alkoxy, and carboxy groups. In addition, one or more of the carbon atoms may be substituted by a heteroatom such as oxygen or nitrogen. Imidates may be prepared as described in *Zh. Obs. Khimii*, vol. 36(5), pp. 862–71 (1966), CA 65 12206c and *J. Org. Chem.*, Vol. 30, page 3724 (1965), which are herein incorporated by reference. Examples of useful groups for $R^a$ and $R^b$ include fluoroalkyl, perfluoroalkyl, and perfluoro polyether groups (e.g., as described in U.S. Pat. No. 5,266,650). In addition, more than one imidate group may be included in a compound. Examples of useful imidates, include for example, $CF_3O(CF_2)_mOCF(CF_3)C(NH)OCH_3$ where m is an integer from 1 to 4, and $C_3F_7(O(CF_3)CF_2)_nOCF(CF_3)C(NH)OCH_3$ where n=0 to 3.

In yet another embodiment to effect curing of the nitrile groups in a fluoropolymer, compounds of the following formula may be used as curative:

$$\{R^dA\}^{(-)}\{QR^c_k\}^{(+)} \quad \text{(III)}$$

wherein $R^d$ represents an alkyl or alkenyl group having from 1 to 20 carbon atoms, cycloalkyl or cycloalkenyl having 3 to 20 carbon atoms or aryl or alkaryl having from 6 to 20 carbon atoms and wherein $R^d$ may be partially or fully fluorinated and/or wherein $R^d$ may be substituted such as where one or more hydrogen atoms in the group is replaced with Cl, Br or I. Additionally, $R^d$ may include one or more heteroatoms such as O, P, S or N. Examples of perfluorinated groups $R^d$ include perfluoroalkyl groups of the formula $C_nF_{2n+1}$ where n is 1 to 20, perfluorocycloalkyl groups of the formula $C_mF_{2m-1}$ where m is 3 to 20, $C_6$–$C_{20}$ perfluoraryl groups and $C_2$–$C_{20}$ perfluoroalkenyl groups.

A is an acid anion or an acid derivative anion, e.g., A can be COO, $SO_3$, $SO_2$, S, $SO_2NH$, $PO_3$, $CH_2OPO_3$, $(CH_2O)_2PO_2$, $C_6H_4O$, $OSO_3$, O (in the cases where $R^d$ is aryl or alkylaryl),

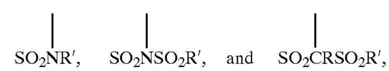

preferably COO, O, $C_6H_4O$, $SO_3$, $OSO_3$, or

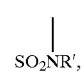

most preferably COO, O, $SO_3$, and $OSO_3$; R' can have one of the meanings of $R^c$ set forth below or can be a perfluorinated group as listed in respect of $R^d$ above and R can have one of the meanings set forth below for $R^c$ and a particular selection for R' may be the same or different from $R^d$, and one or more A groups may be attached to $R^d$.

Q is phosphorous (P), sulfur (S), nitrogen (N), arsenic (As), or antimony (Sb), and k is the valence of Q.

Each $R^c$ is, independently, hydrogen or a substituted or unsubstituted $C_1$–$C_{20}$ alkyl, aryl, aralkyl, or alkenyl group. As used herein, "substituted" means substituted by substituents that do not interfere with the desired product. Examples of suitable substituents include halogen (e.g., Cl, F, Br, I), cyano, $OR^e$, and $COOR^e$ groups wherein $R^e$ is a group selected from hydrogen or the alkali or alkaline earth metals, of which H, K, Na, and $NH_4$, are preferred, $C_1$ to $C_{20}$ alkyl, aryl, aralkyl, alkenyl, and fluorinated or perfluorinated analogues thereof. In addition, any pair of said $R^e$ groups may be connected to each other and the Q atom to form a heterocyclic ring.

Examples of anions $R^dA$ in above formula (III) include $C_4F_9SO_3$, $C_3F_7COO$, $C_7F_{15}COO$, $C_8F_{17}SO_3$, $C_4F_9SO_2NSO_2C_4F_9$, $CF_3CF(CF_3)CH_2O$ and $C_nF_{2n+1}CH_2O$ wherein n is 2 to 100 (preferably 2 to 20, and more preferably 2 to 10). Further anions include anions of the general formula:

$$R_x\text{-}Ph_y\text{-}(\text{—}(CH_2)_n\text{-}D)_m$$

wherein Ph is phenyl, each $R_x$ is the same or different alkenyl or an alkyl of 1 to 10 carbon atoms, which may be substituted or unsubstituted, x is 0 to 5, y is 0 or 1, n is 0 to 10, m is 1 to 5, and D is selected from COO, $OSO_3$, $SO_3$, and O (when y is 1), provided that the sum of x and m is 6 or less. Useful anion examples include Ph-COO, Ph-O, $CH_3$—$(CH_2)_p$—O—$SO_3$ when p is 1 to 10, and carboxylates of the general formula R—COO wherein R is alkenyl, an alkyl of 1 to 10 carbon atoms, e.g., acetate or propionate, or an aryl of 6 to 20 carbon atoms. Multi-carboxylates, multi-sulfates and multi-sulfonates are also useful, e.g., $^{(-)}OOC—(CH_2)_p—COO^{(-)}$, $^{(-)}OOC—(CF_2)_p—COO^{(-)}$ wherein p is 0 to 10, and $Ph\text{-}((CH_2)_p—COO^{(-)})_q$ wherein p and q are independently 1 to 4. A preferred species of bifunctional carboxylic acid is oxalic acid. In addition, blends of two or more compounds as described above can be used for $R^dA$ in formula (III).

Representative aromatic polyoxy compounds include di-, tri-, and tetraoxybenzenes, naphthalenes, and anthracenes, and bisphenols of the formula:

$$^{(-)}O_z\text{-}Ph\text{-}G_y\text{-}Ph\text{-}O_z^{(-)}$$

wherein G is a bond or a difunctional aliphatic, cycloaliphatic, or aromatic radical of 1 to 13 carbon atoms, or a thio, oxy, carbonyl, sulfinyl, or sulfonyl radical, G and/or Ph are optionally substituted with at least one chlorine or fluorine atom, y is 0 or 1, z is 1 or 2, and any aromatic ring of the polyoxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. In the above bisphenol formula that the oxygen groups can be attached in any position (other than number one) in either ring. Blends of two or more such compounds can also be used. A preferred class of materials includes the bisphenols, such as those having the general formula:

$$^{(-)}O\text{-}Ph\text{-}C(CX_3)_2\text{-}Ph\text{-}O^{(-)},$$

wherein X is H, Cl, or F (e.g,. bisphenol AF). When multifunctional acids are used, the mono-, bis-, and multi-complexes can be used.

As is known in the art, an organo-onium is the conjugate acid of a Lewis base (e.g., phosphine, amine, and sulfide) and can be formed by reacting said Lewis base with a suitable alkylating agent (e.g., an alkyl halide or acyl halide) resulting in an expansion of the valence of the electron donating atom of the Lewis base and a positive charge on the organo-onium compound. The preferred organo-onium compounds for the compounds of formula (III) contain at least one heteroatom, i.e., a non-carbon atom such as P, S, N, bonded to organic moieties.

One class of quaternary organo-onium compounds particularly useful broadly comprises relatively positive and relatively negative ions wherein a phosphorus, sulfur, or nitrogen generally comprises the central atom of the positive ion, and the negative ion is an alkyl or cycloalkyl acid anion that may be partially fluorinated, i.e., at least one hydrogen atom is replaced with fluorine, provided that at least one non-fluorine atom remains.

Examples of suitable precursor compounds when Q is phosphorous include tetramethylphosphoniums, tributylallylphosphoniums, tributylbenzylphosphoniums, dibutyldiphenylphosphoniums, tetrabutylphosphoniums, tributyl(2-methoxy) propylphosphoniums, triphenylbenzylphosphoniums, and tetraphenylphosphoniums. These phosphoniums can be hydroxides, chlorides, bromides, alkoxides, phenoxides, etc. The tetraalkyl phosphonium hydroxides and tetraalkyl phosphonium alkoxides are preferred.

Another class of phosphonium compounds include those selected from the group consisting of amino-phosphonium, phosphorane (e.g., triarylphosphorane), and phosphorous containing iminium compounds. Amino-phosphonium compounds that can be used include those described in the art, for example, in U.S. Pat. No. 4,259,463 (Moggi et al.).

When Q is nitrogen, the preferred positive ion has the general formula is $NR^c_4$ or $HNR^c_3$, wherein $R^c$ is as described above. Representative quaternary organo-oniums useful as precursor compounds include phenyltrimethylammoniums, tetrapentylammoniums, tetrapropylammoniums, tetrahexylammoniums, tetraheptylammoniums, tetramethylammoniums, tetrabutylammoniums, tributylbenzyl ammoniums, tributylallylammoniums, tetrabenzylammoniums, tetraphenylammoniums, diphenyl diethylamino ammoniums, triphenylbenzylammoniums, 8-benzyl-1,8-diazobicyclo[5.4.0]-7-undeceniums, benzyltris (dimethylamino) phosphoniums, and bis(benzyldiphenyl phosphine)iminiums. These ammoniums can be hydroxides, chlorides, bromides, alkoxides, phenoxides, etc. Of these positive ions, tetrabutylammonium and tetraphenylammonium are preferred.

When Q is As or Sb, the preferred positive ions include tetraphenylarsonium chloride and tetraphenylstibonium chloride. Overall, the tetraalkylphosphonium compounds are more preferred for the positive ion of the component represented by formula (III). Mixtures of organo-onium compounds are also useful.

The precursors described above are generally commercially available (e.g., from Aldrich Chemicals, Milwaukee, Wis.) or may be prepared by procedures described in the art. The acids or salts of hydrocarbons useful in preparing the components of formula (III) typically have the general formula $R^dCOOM$, $R^dSO_3M$, $R^dOSO_3M$, or $R_dOM$. In these formulas, $R^d$ is as described above with formula (III), and M is hydrogen, or an alkali or alkaline earth metal. Representative materials are the carboxylates, sulfates, sulfonates, and phenolates described above. In addition, blends of two or more compounds of formula (III) as described above, which includes blends of two or more $R^dA$ groups and/or two or more $QR^c_k$ groups, can be used.

A composition including the compounds of formula (III) can be prepared by any suitable method. For example, the two components of the active complex of formula (III), can be incorporated separately as an acid or a salt, e.g., $R^dAX$ wherein X is selected from hydrogen or the alkali or alkaline earth metals, of which H, K, Na, and $NH_4$, are preferred, and $QR^c_kZ$, wherein Z is selected from an anion, which may be organic or inorganic, preferably Cl, Br, OH, $OR^3$, or $SO_4$. The two components can be added to the fluoroelastomer gum separately or as a mixture. In this method, the active complex is formed in situ during processing, heating, and curing. To avoid contamination and the inclusion of metal salts, which is especially important for clean applications (e.g., semiconductors), the complexes should be prepared before incorporation into the curable fluoroelastomer composition, and the resulting salts, XZ, should be filtered or washed out before the active complex is incorporated into the curable fluoroelastomer composition. Other suitable methods, which are known in the art, also may be used to prepare the compounds of formula (III). For example, the two components of the catalyst composition of formula (III) can be dissolved into a suitable solvent (e.g., an alcohol) before precipitating and filtering out the resulting salt, XZ. Salt formation can be avoided by reacting the onium component as the onium-hydroxide or onium-alkoxide with the acid component of the catalyst composition (e.g., reacting $Bu_4NOH$ with RCOOH). The active complexes can be incorporated into the curable fluorelastomer composition when dissolved in a solvent or as a dried compound. An excess of the $QR^c_k$ material (e.g., tetraalkyl phosphonium chloride) or the free acid (e.g., $R^dAH$) does not detrimentally affect the properties of the polymer.

The compounds of formula (III) may be used in an amount of 0.1 to 10 phr of fluoropolymer, preferably 0.5 to 5 phr to cause curing of the fluoropolymer to a fluoroelastomer having desirable physical and mechanical properties.

Compounds of formula (III) may be advantageously used in combination with an optional alcohol having the general formula $R^2$—OH, wherein $R^2$ is alkyl group having from 1 to 20 carbon atoms, more preferably 6 to 12 carbon atoms. $R^2$ can be partially fluorinated, e.g., $R_f$—$CH_2$—OH or $R_f$—$CH_2CH_2$—OH wherein $R_f$ is as perfluorinated hydrocarbon group such as a perfluorinated alkyl group. While the addition of alcohol is not required, it may be helpful to modify the viscosity and cure characteristics of the curable fluoroelastomer composition. The alcohol should typically be selected to be compatible in the overall composition. The alcohol should also remain in a mixture of fluoropolymer with the compounds of formula (III) during milling operations and then evaporate during subsequent processing at higher temperatures, during post-cure operations. Examples of presently preferred alcohols include octanol and decanol. An effective amount of alcohol is used in the curative system. This amount is determined by several factors including the desired ratio of alcohol to compounds of formula (III), the particular alcohol chosen, and the milling temperature. For example, a higher desired ratio of a lower-boiling alcohol and a higher milling temperature will lead to including greater amounts in the milling process. The particular level for a selected composition is normally a matter of routine experimentation. Generally, this amount is in the range of 0.01 to 10 (more preferably 0.5 to 5) parts by weight alcohol per hundred parts by weight fluoropolymer.

To effect curing of nitrile group containing fluoropolymers still further compounds that can be used, include amino phenols (U.S. Pat. No. 5,677,389), ammonia salts (U.S. Pat. No. 5,565,512), amidoxines (U.S. Pat. No. 5,668,221) and other ammonia generating comp (PCT 00/09603) or imidates.

The fluoropolymers including a nitrile containing cure site component can also be cured using one or more peroxide curatives. Suitable peroxide curatives for this purpose include those listed above. It will further be understood by one skilled in the art that the curable fluoroelastomer may include a mixture of cure site components, such as a mixture of nitrile containing cure sites and cure sites including a halogen capable of participating in a peroxide cure reaction. In the latter case, a mixture of one or more compounds suitable for causing curing the nitrile component and peroxides will generally be employed.

Another component which is usually included in a cure composition based on an organic peroxide and/or nitrile containing cure site component, is a coagent composed of a polyunsaturated compound, which is capable of cooperating with the peroxide to provide a useful cure. These coagents can be added in an amount equal to 0.1 and 10 parts per hundred parts fluoropolymer, preferably between 2–5 parts per hundred parts fluoropolymer. Examples of useful coagents include triallyl cyanurate; triallyl isocyanurate; triallyl trimellitate; tri(methylallyl) isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate. Other useful coagents include the bis-olefins disclosed in EPA 0 661 304 A1, EPA 0 784 064 A1 and EPA 0 769 521 A1.

The curable fluoroelastomer composition may contain further additives, such as carbon black, stabilizers, plasticizers, lubricants, fillers, and processing aids typically utilized in fluoropolymer compounding can be incorporated into the compositions of the present invention, provided they have adequate stability for the intended service conditions. Preferably organic fillers such as fluoropolymers particles may be added. For example, a perfluoroalkoxy copolymer (PFA) deriving from copolymerizing TFE and a perfluoro vinyl ether such as perfluoro(n-propyl vinyl ether) (PPVE) may be added or fluorinated ethylene/propylene copolymer (FEP) deriving a copolymerization of TFE and HFP can be added.

The curable fluoroelastomer compositions may be prepared by mixing a fluoropolymer, a cure composition and other additives in conventional rubber processing equipment. Such equipment includes rubber mills, internal mixers, such as Banbury mixers, and mixing extruders.

The curable fluoroelastomer composition is conveniently processed to a fluoroelastomer article such as for example gaskets or seals, by using known molding techniques and curing the fluoroelastomer composition by subjecting it to heat and pressure. Thereafter the article may be subjected to a post cure cycle as is known in the art. The fluoroelastomers obtained in this invention were found to be suitable for use in the semiconductor industry and in particular in sealing of equipment used in wafer and chip production. In particular, the fluoroelastomers obtained have a very low level of metal ions remaining therein. Typically the total amount of metal ions is less than 10,000 ppb (parts per billion), preferably not more than 7,000 ppb. Also, it was found that when ammonium perfluorooctanoic acid was used as the fluorinated emulsifier in the preparation of fluoropolymer, any remainder thereof in the fluoropolymer sufficiently decomposed during curing of the fluoroelastomer such that no adverse influences thereof on the suitability of the fluoroelastomer for use in wafer manufacturing remained.

The invention is further illustrated with reference to the following examples, without however the intention to limit the invention thereto. All parts are by weight unless indicated otherwise.

EXAMPLES

Test methods:

Determination of the IR Absorbance Ratio.

To quantify the amount of carbonyl end groups, a Fourier transform infrared spectrum of the fluoropolymer was made and the absorbance ratio of the peak area (1840 $cm^{-1}$–1620 $cm^{-1}$) versus the peak area (2740 $cm^{-1}$–2220 $cm^{-1}$) was calculated from this spectrum.

Mooney Viscosity

The Mooney viscosity values were measured according to ASTM D 1646.

Melt Flow Index

The melt flow index (MFI) was carried out according to DIN 53735, ISO 12086 or ASTM D-1238 at a support weight of 5.0 kg and a temperature of 372° C. The MFIs cited here were obtained with a standardized extrusion die of 2.1 mm diameter and a length of 8.0 mm.

Particle Size Determination

The latex particle size determination was conducted by means of dynamic light scattering with a Malvern Zetazizer 1000 HSA in accordance to ISO/DIS 13321. Prior to the measurements, the polymer latexes as yielded from the polymerisations were diluted with 0.001 mol/L KCl-solution, the measurement temperature was 20° C. in all cases.

Example 1

A 40 liter kettle was charged with 25 L of water, 430 g of a 30% solution of ammonium perfluorooctanoate (FX 1006, 3M), 50 g of ammonium perfluorobutylsulfinate (17% in water) and 40 g $CF_2$═CF—O—$(CF_2)_5$CN (NVE; pre-emulsified using an Ultra-turrax and a microfluidizer in 120 g water with 1.5 g FX 1006; average particle size~250 nm). The oxygen free kettle was further charged with 520 g TFE and 1504 g PMVE. At 60° C., 12 bar pressure 40 g of ammonium persulfate (APS) was fed to initiate the polymerization. During 7.1 h 6.0 kg TFE, 5.0 kg PMVE and 0.45 kg pre-emulsified NVE were continuously fed. The resulting latex had an solid content of 31%, particle size 65 nm, pH=2.8; the coagulated polymer had a composition of 32.2 mol % PMVE, 1.3 mol % NVE and 66.5 mol % TFE; the IR-absorbance ratio was determined as 0.07; Mooney 10+1, 121° C.=50.

The fluoropolymer dispersion was co-coagulated with an aqueous PFA dispersion (solid content 24 wt %, TFE=96 wt %, PPVE=4 wt %, Mp=309° C.; MFI [5 kg/372° C]=2 g/10 min) in a ratio w=80/20 by adding the blend into a 0.6% $MgCl_2$-solution under rigorous agitation. The coagulated blend was washed 6 times with hot water, and then dried at 110° C. for 16 h.

Comparative Example 1

A 150 liter kettle was charged with 105 L of water, 1740 g of 30% solution ammonium perfluorooctanoate (FX 1006, 3M) and 90 g pre-emulsified NVE. The oxygen free kettle was further charged with 1240 g TFE and 3600 g PMVE. At 73° C., 10 bar 260 g APS was fed to initiate the polymerization. During 5.5 h 24.0 kg TFE, 20.1 kg PMVE and 1.78 kg pre-emulsified NVE were fed. The latex had a solid content of 30%, particle size 70 nm, pH 2.5; composition of the polymer: NVE 1.3 mol %, PMVE 32.5, TFE 66.2 mol %. Mooney viscosity 55; IR-absorbance ratio=0.25.

A 80:20 PFA-blend was prepared following the procedure from Example 1 and coagulated and washed as described in example 1.

Example 2

An oxygen free 40 l kettle was charged with 35 l water, 500 g of a 30% solution of ammonium perfluoro octanoate (FX 1006, 3M), 52 g ammonium perfluorobutylsulfinate, 350 g TFE, 1150 g PMVE and 10 g bromotrifluoroethylene (BTFE). At 71° C., 14 bar pressure, the polymerization was initiated by adding 85 g APS over 30 min. During 4.9 h 15.7 kg of monomers in a ration of TFE (50.8%), PMVE (48.4%) und BTFE (0.79%) were fed. The resulting latex had an solid content of 31%. The isolated polymer had a Mooney viscosity 10+1/121° C.=65; IR-absorbance ratio=0.048.

The latex was coagulated by adding the latex into 40 l of a 0.6% $MgCl_2$-solution under vigorous agitation. The coagulated material was washed 6 times with hot water and then dried at 120° C. for 16 h.

The pyrolized material had an metal content as shown in Table 1.

Metal Ion Analysis

The polymers obtained in examples 1 and 2 and comparative example 1 were pyrolysed at 550 ° C. and the residuals were submitted to ICP-MS analysis. The following results were obtained.

| Metal ion | C1 | Ex 1 | Ex 2 |
|---|---|---|---|
| Aluminium (Al) | 320 | 70 | 43 |
| Barium (Ba) | 17 | 6 | 8 |
| Beryllium (Be) | 0 | 0 | 0 |
| Bismuth (Bi) | 0 | 0 | 0 |
| Cadmium (Cd) | 5 | 0 | 0 |
| Calcium (Ca) | 1300 | 240 | 320 |
| Cesium (Cs) | 0 | 0 | 0 |
| Chromium (Cr) | 60 | 14 | 12 |
| Cobalt (Co) | 15 | 0 | 4 |
| Copper (Cu) | 26 | 13 | 35 |
| Gallium (Ga) | 0 | 0 | 0 |
| Indium (In) | 0 | 0 | 0 |
| Iron (Fe) | 230 | 70 | 50 |
| Lead (Pb) | 470 | 210 | 100 |
| Lithium (Li) | 3 | 0 | 14 |
| Magnesium (Mg) | 46000 | 1200 | 2300 |
| Manganese (Mn) | 6.1 | 3 | 70 |
| Molybdenum (Mo) | 0 | 0 | 0 |
| Nickel (Ni) | 17 | 17 | 13 |
| Potassium (K) | 380 | 170 | 830 |
| Rubidium (Rb) | 0 | 0 | 6 |
| Silver (Ag) | 0 | 0 | 0 |
| Sodium (Na) | 480 | 200 | 240 |
| Strontium (Sr) | 1.8 | 0 | 19 |
| Thorium (Th) | 0 | 0 | 0 |
| Tin (Sn) | 72 | 0 | 60 |
| Titanium (Ti) | 0 | 0 | 0 |
| Vanadium (V) | 0 | 0 | 0 |
| Zinc (Zn) | 120 | 60 | 17 |
| Zirconium (Zr) | 16 | 0 | 0 |
| Total amount | 49538.9 | 2274 | 4143 |

What is claimed is:

1. A curable fluoroelastomer composition comprising:

(a) a perfluoropolymer obtained through an aqueous emulsion polymerization process and having one or more cure-sites selected from a halogen capable of participating in peroxide cure reaction and/or nitrile groups;

(b) an organic peroxide and/or a compound capable of effecting curing of the perfluoropolymer through said nitrile groups; and (c) optionally a polyunsaturated coagent;

wherein the perfluoropolymer, prior to the isolation of the perfluoropolymer from the aqueous dispersion in which it was obtained, is essentially free of ionic end groups and wherein the total amount of metal cations in the composition is not more than 10 μg/g perfluropolymer.

2. A curable fluoroelastomer composition according to claim 1 wherein said perfluoropolymer comprises one or more units derived from a perfluorinated olefin having nitrile groups or a perfluorinated vinyl ether having one or more nitrile groups.

3. A curable fluoroelastomer composition according to claim 1 wherein the perfluoropolymer is free of ionic end groups or comprises ionic end groups in an amount such that the absorbance ratio determined by calculating the integrated peak intensity within the range of 1840 $cm^{-1}$–1620 $cm^{-1}$ to the integrated peak intensity in the range 2740 $cm^{-1}$–2220 $cm^{-1}$ in a Fourier transform infrared spectrum of the perfluoropolymer, is less than 0.1.

4. A curable fluoroelastomer composition according to claim 1 wherein the perfluoropolymer, comprises repeating units of a fluorinated olefin selected from the group consisting of (a) tetrafluoroethylene (b) chlorotrifluoethylene (c) a perfluorinated monomer selected from perfluorinated $C_3$–$C_8$ olefins and perfluorinated vinyl ethers; and (d) mixtures thereof.

5. A cured fluoroelastomer obtained by curing a curable fluoroelastomer composition as defined in claim 1.

6. A method comprising sealing electronic component manufacturing equipment with the fluoroelastomer defined in claim 5.

7. Method of making a perfluoropolymer for use in a curable fluoroelastomer composition as defined in claim 1, comprising (i) an aqueous emulsion polymeriztion of a fluorinated monomer selected from tetrafluoroethylene, chlorotrifluoroethylene and mixtures thereof, a fluorinated monomer selected from perfluorinated $C_3$–$C_8$ olefins, perfluorinated vinyl ethers and mixtures thereof and one or more fluorinated cure-site monomers selected from perfluorinated monomers having one or more halogen atoms capable of participating in a peroxide cure reaction or one or more nitrile groups, whereby the polymerization is being initiated with an initiator system selected from a combination of a fluoroaliphatic sulfinate and an oxidizing agent capable of oxidizing the sulfinate to a sulfonyl radical and/or a combination of free radical initiator and a chloride salt such that the resulting perfluoropolymer is essentially free of ionic end groups and (ii) isolating the perfluoropolymer formed from the resulting aqueous dispersion.

8. Method according to claim 7 wherein said perfluoropolymer is isolated from the resulting aqueous dispersion by adding thereto a sufficient amount of a metal salt to cause coagulation of the perfluoropolymer particles in the dispersion.

9. A perfluoropolymer obtained by an aqueous emulsion polymerization and comprising units derived from a fluorinated monomer selected from tetrafluoroethylene, chlorotrifluoroethylene and mixtures thereof, one or more units derived from a fluorinated monomer selected from perfluorinated $C_3$–$C_8$ olefins, perfluorinated vinyl ethers and mixtures thereof and one or more units deriving from fluorinated cure-site monomers selected from perfluorinated monomers having one or more halogen atoms capable of participating in a peroxide cure reaction or one or more nitrile groups, the perfluoropolymer, prior to the isolation of the perfluoropolymer from the aqueous dispersion in which it was obtained, comprising perfluoroaliphatic end groups and/or $CF_2Cl$ end groups and being essentially free of ionic end groups and the amount of metal ions contained in the perfluoropolymer being less than 10 μg/g of perfluoropolymer.

* * * * *

UNITED STATES PATENT AND TRADEMARK OFFICE

CERTIFICATE OF CORRECTION

PATENT NO. : 6,943,228 B2 
APPLICATION NO. : 10/627461
DATED : September 13, 2005
INVENTOR(S) : Werner M.A. Grootaert It is certified that error appears in the above-identified patent and that said Letters Patent is hereby corrected as shown below:

Column 1, line 56, "used in seats of" should be --used in seals of--.

Column 2, line 13, "and/or nitrite groups;" should be --and/or nitrile groups;--.

Column 7, line 15, "Z represents $COO^-$ or $SO_3^-$ $M^b$ represents" should be --Z represents $COO^-$ or $SO_3^-$; $M^b$ represents--.

Column 9, line 4 (structure) " 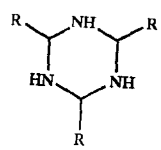

" should be -- 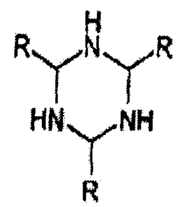

--.

Column 12, line 53, or $R_d$OM." should be --or $R^d$OM.--.

Column 17, line 3, (Claim 1), "10 μg/g perfluropolymer" should be --10 ug/g perfluoropolymer--.

Column 17, line 20, (Claim 4), "(b) chlorotrifluoethylene (c)" should be --(b) chlorotrifluoroethylene (c)--.

Column 17, line 31, (Claim 7), "emulsion polymeriztion" should be --emulsion polymerization--.

Signed and Sealed this

Seventeenth Day of October, 2006

JON W. DUDAS
*Director of the United States Patent and Trademark Office*